(12) United States Patent
Srivastav et al.

(10) Patent No.: US 11,714,442 B2
(45) Date of Patent: Aug. 1, 2023

(54) CONTROLLING ELECTRICAL POWER CONSUMPTION FOR ELEMENTS IN AN ELECTRONIC DEVICE BASED ON A PLATFORM ELECTRICAL POWER LIMIT

(71) Applicants: Advanced Micro Devices, Inc., Santa Clara, CA (US); ATI Technologies ULC, Markham (CA)

(72) Inventors: Meeta Surendramohan Srivastav, Austin, TX (US); Ashwini Chandrashekhara Holla, Toronto (CA); Alex Sabino Duenas, Toronto (CA); Xinzhe Li, Toronto (CA); Michael John Austin, Austin, TX (US); Indrani Paul, Round Rock, TX (US); Sriram Sambamurthy, Austin, TX (US)

(73) Assignees: ATI Technologies ULC, Markham (CA); Advanced Micro Devices Inc., Santa Clara, CA (US)

(*) Notice: Subject to any disclaimer, the term of this patent is extended or adjusted under 35 U.S.C. 154(b) by 0 days.

(21) Appl. No.: 17/560,823

(22) Filed: Dec. 23, 2021

(65) Prior Publication Data
US 2023/0205248 A1    Jun. 29, 2023

(51) Int. Cl.
*G06F 1/28* (2006.01)
*G05F 1/66* (2006.01)

(52) U.S. Cl.
CPC . *G05F 1/66* (2013.01); *G06F 1/28* (2013.01)

(58) Field of Classification Search
CPC ..................................... G05F 1/66; G06F 1/28
See application file for complete search history.

(56) References Cited

U.S. PATENT DOCUMENTS

| 2008/0222435 A1* | 9/2008 | Bolan .................... G06F 1/3203 713/310 |
| 2019/0250689 A1* | 8/2019 | Ivanov ....................... H02J 1/14 |

* cited by examiner

*Primary Examiner* — Gary Collins
(74) *Attorney, Agent, or Firm* — Park, Vaughan, Fleming & Dowler LLP

(57) ABSTRACT

An electronic device includes an accelerated processing unit (APU) and multiple elements. The APU performs operations for a platform boost and throttle (PBT) controller. For the operations, the APU receives a platform electrical power limit, the platform electrical power limit being a limit on a total electrical power allowed to be consumed by a group of the elements at a given time. The APU then determines a present platform electrical power consumption. The APU next adjusts one or more operating parameters for specified elements from among the group of elements to control electrical power consumption by the specified elements based on a relationship between the present platform electrical power consumption and the platform electrical power limit.

23 Claims, 5 Drawing Sheets

CONTROLLING ELECTRICAL POWER CONSUMPTION FOR ELEMENTS IN AN ELECTRONIC DEVICE BASED ON A PLATFORM ELECTRICAL POWER LIMIT

BACKGROUND

Related Art

Some electronic devices include processors that perform computing, control, and other operations along with memories that store data for use by the processors. For example, electronic devices can include accelerated processing units (APUs) that are used for general purpose computing operations, as well as graphics processing units (GPUs) or GPU cores that are used for graphics processing operations and other computing operations. Many of such electronic devices also include other functional blocks and devices that are used for/when executing program code and/or for other purposes in the electronic devices (e.g., data storage devices, network interfaces, peripherals, human interfaces, etc.). For example, electronic devices such as desktops (i.e., desktop computers), laptops, and servers often include processors and memories along with other functional blocks and devices. The electronic devices can also include one or more management units that control operating states of the processors, memories, and/or other functional blocks and devices so that the electronic devices provide a desired level of performance (e.g., are adequately responsive to user inputs, etc.) while avoiding unnecessary consumption of electrical power. For example, the electronic devices can include system management units, embedded controllers, and/or other controllers that perform operations for controlling the operating states of the processors, memories, and/or other functional blocks and devices.

In some of the above-described electronic devices, the management unit(s) allocate respective portions of an overall electrical power budget to processors, memories, and other functional blocks and devices. For example, a processor can be allocated a particular number of watts from the overall electrical power budget, a memory can be allocated a particular number of watts, etc. In this case, the processors, memories, and/or other functional blocks and devices are generally required to operate within the allocated respective portions—and thus the processors, memories, and/or other functional blocks and devices may not be allowed to consume more electrical power than they are allocated at any given time. In these electronic devices, the respective portions of the electrical power budget allocated to each of the processors, memories, and the other functional blocks and devices may be set so that their available electrical power is sufficient to meet a specified power demand. For example, an amount of electrical power that is provisioned to each processor, memory, and/or other functional block and/or device can be set to a maximum amount of electrical power that the processor, memory, and/or other functional block and/or device is expected to draw at any given time. The portions of the overall electrical power budget allocated to processors, memories, and/or other functional blocks and devices in many cases are "worst case," with designers allocating electrical power to ensure that the processors, memories, and/or other functional blocks and devices are able to be provided with adequate power for relatively uncommon—and often rare—maximum electrical power operating states. In other words, in being cautious about avoiding the situation where there is inadequate power available for the processors, memories, and other functional blocks and devices, designers can request larger allocations of respective portions of electrical power for each processor, memory, and/or other functional block and/or device. The allocated electrical power regularly goes unused because the processor, memory, and/or other functional block and/or device do not operate in operating states that require the full amount of allocated electrical power. At least some, and possibly a considerable amount, of the overall electrical power budget for the processors, memories, and other functional blocks and devices is therefore unused. This leads to inefficient use of electrical power—and can lead to processors, memories, and/or other functional blocks and devices operating with less than optimal performance.

BRIEF DESCRIPTION OF THE FIGURES

Throughout the figures and the description, like reference numerals refer to the same figure elements.

DETAILED DESCRIPTION

Figure 1:
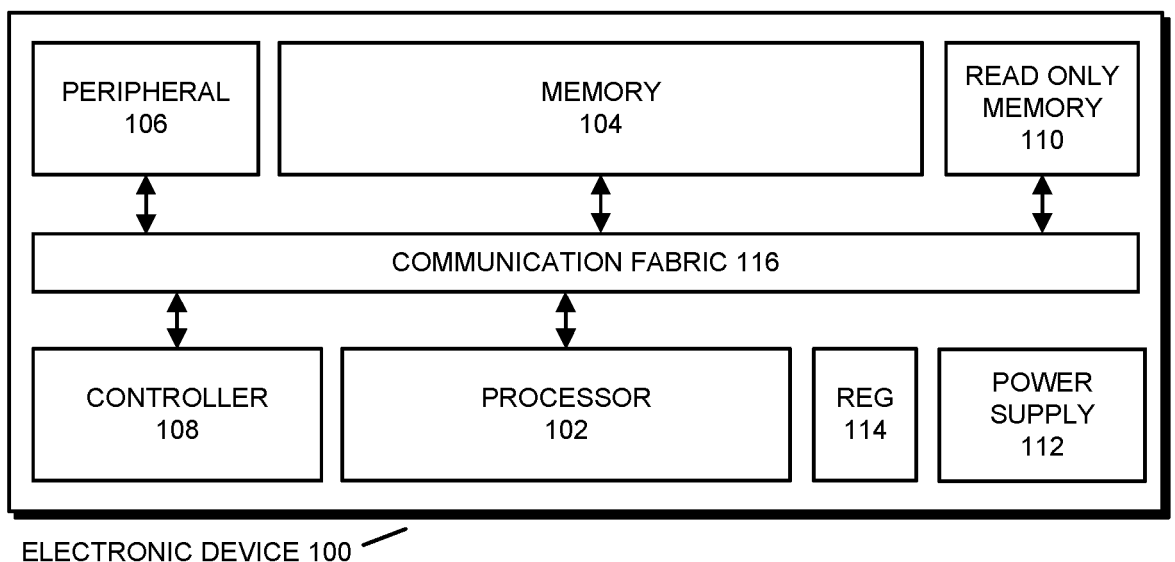
FIG. 1 presents a block diagram illustrating an electronic device in accordance with some implementations.

The following description is presented to enable any person skilled in the art to make and use the described implementations and is provided in the context of a particular application and its requirements. Various modifications to the described implementations will be readily apparent to those skilled in the art, and the general principles described herein may be applied to other implementations and applications. Thus, the described implementations are not limited to the implementations shown, but are to be accorded the widest scope consistent with the principles and features described herein.

In the following description, various terms are used for describing implementations. The following is a simplified and general description of some of the terms. Note that these terms may have significant additional aspects that are not recited herein for clarity and brevity and thus the description is not intended to limit these terms.

Functional block: functional block refers to a set of interrelated circuitry such as integrated circuit circuitry, discrete circuitry, etc. The circuitry is "interrelated" in that circuit elements in the circuitry share at least one property.

For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, may be included in the same electronic devices, etc. The circuitry in a functional block can have any number of circuit elements, from a single circuit element (e.g., a single integrated circuit logic gate or discrete circuit element) to millions or billions of circuit elements (e.g., an integrated circuit memory). In some implementations, functional blocks perform operations "in hardware," using circuitry that performs the operations without executing program code.

Data: data is a generic term that indicates information that can be stored in memories (e.g., a main memory, a cache memory, etc.) and/or used in computational, control, and/or other operations. Data includes information such as actual data (e.g., results of computational or control operations, outputs of processing circuitry, inputs for computational or control operations, variable values, sensor values, etc.), files, program code instructions, control values, variables, and/or other information.

In the described implementations, an electronic device includes elements (e.g., functional blocks, devices, etc.) such as processors, memories, peripheral devices, network interfaces, etc. For example, the electronic device may be or include a desktop computer, a laptop computer, or a tablet computer that includes, along with various other functional blocks and/or devices, an accelerated processing unit (APU) with one or more central processing unit (CPU) cores and an integrated graphics processing unit (GPU) and/or a discrete/separate GPU. In operation, the elements in the electronic device consume electrical power while performing respective operations. In order to ensure that sufficient electrical power is available for the elements and to avoid issues associated with the consumption of too much or too little electrical power (e.g., incorrect operation or failure, power supply problems, overheating, etc.), the electronic device controls the electrical power consumed by the elements. In some implementations, platform boost and throttle (PBT) controller software executing on the electronic device (e.g., executed by an embedded controller, etc.) allocates electrical power to the elements. In these implementations, therefore, the PBT controller provisions electrical power to the elements so that a respective amount of electrical power is made available for each of the elements. For example, the PBT controller can allocate W watts for a CPU or CPU core in the electronic device, so that the CPU or CPU core has W watts of electrical power available when needed. The individual elements may not always use all of the respective provisioned electrical power (e.g., may operate in a lower-power mode or be powered down, may be performing lower-intensity operations, etc.), but are generally limited to operating within the respective provisioned electrical power.

The above-described PBT controller interacts with platform management framework driver software executing on the electronic device for allocating electrical power to the elements in the electronic device. For this interaction, the platform management framework driver computes a platform electrical power limit as a function of various inputs characterizing an operating state of the electronic device and then communicates the platform electrical power limit to the PBT controller. Generally, the platform electrical power limit is a limit on the total electrical power that is permitted to be consumed by a group of elements (e.g., functional blocks, devices, etc.) in an electronic device at any given time. The PBT controller next determines a present electrical power consumption by elements in the group of elements—i.e., the electrical power being consumed at the current time (or within a specified window of time). For example, in some implementations, the PBT controller acquires, from electrical power supply circuitry in the electronic device (e.g., voltage regulators, etc.) information about electrical currents being supplied to elements in the group of elements. The PBT controller then computes the present electrical power consumption by the group of elements based on the electrical currents. Based on a relationship (e.g., a difference, an offset, etc.) between the present platform electrical power consumption and the platform electrical power limit, the PBT controller can adjust one or more operating parameters (e.g., voltages, currents, bus interface speeds, work queue lengths, etc.) for specified elements from among the group of elements to control electrical power consumption by the specified elements. Generally, for this operation, the PBT controller determines whether (or not) there is excess electrical power available due to some or all of the group of elements not consuming all of their respective provisioned electrical power. If there is excess electrical power, the PBT controller can temporarily reallocate the excess electrical power to the specified elements to help boost the performance of the specified elements. That is, the PBT controller can temporarily "borrow" some of the allocated electrical power from more idle elements to be provided to the specified elements so that the performance of the specified elements can be boosted. Alternatively, if the PBT controller determines that there is a power deficit, the PBT controller can reallocate electrical power from the specified elements to other elements in the group of elements, thereby temporarily throttling the specified elements, but providing needed electrical power to other elements.

In some implementations, the various inputs used by the platform management framework driver for computing the platform electrical power limit include inputs that identify or characterize the electronic device's ability to provide electrical power to elements. For example, in some implementations, the inputs include properties of devices presently connected to the electronic device, such as a type of each device (e.g., USB devices, elements connected to a system bus, etc.) and/or the electrical power consumption of some or all of the devices presently in and/or connected to the electronic device. For instance, when a device is connected to or disconnected from the electronic device, and thus the electrical power to be provided to connected devices changes, the platform management framework driver can update the platform electrical power limit accordingly. As another example, in some implementations, the inputs include properties of an electrical power supply for the group of elements. For example, whether an electrical power supply for the electronic device is a wall outlet—i.e., an alternating current (AC) to direct current (DC) power converter "brick"—or battery power source, as well as a capacity of the power converter and/or the present electrical charge state of the battery. As yet another example, in some implementations, the inputs include electrical power consumption limit settings for the electronic device. In these implementations, each of the inputs, or different values thereof, are used for determining the platform electrical power limit via a mathematical function, a lookup table, etc. For example, in some implementations, a lookup table relates each combination of values for the inputs to a platform electrical power limit and the platform management framework driver performs a lookup in the lookup table to compute the platform electrical power limit.

In some implementations, providing surplus electrical power to specified elements to help boost the performance of the specified elements as described above involves the PBT controller setting the operating parameters so that electrical power consumed by the specified elements is increased. For example, one or both of a frequency of a controlling clock or a voltage at which electrical power is provided to the specified elements can be increased to increase the electrical power consumed by the elements. For this operation, the PBT controller computes an electrical power excess based on a difference between the present electrical power consumption and the platform electrical power limit. The PBT controller then sets the operating parameters for each of the specified elements so that electrical power consumed by that specified element increases by an amount proportional to a respective portion of the electrical power excess.

In some implementations, reallocating electrical power from the specified elements to other elements in the group of elements when there is a deficit in electrical power involves the PBT controller setting the operating parameters so that electrical power consumed by the specified elements is reduced. For example, one or both of a frequency of a controlling clock or a voltage at which electrical power is provided to the specified elements can be decreased to reduce the electrical power consumed by the elements. For this operation, the PBT controller computes an electrical power deficit based on a difference between the present electrical power consumption and the platform electrical power limit. The PBT controller then sets the operating parameters for each of the specified elements so that electrical power consumed by that specified element is reduced by an amount proportional to a respective portion of the electrical power deficit.

In some implementations, the PBT controller itself does not directly set the operating parameters for the specified elements as described herein, but instead requests the operating parameter changes via one or more hardware and/or software intermediaries (e.g., controllers, operating systems, a BIOS, etc.). In some of these implementations, the PBT controller's requests to set the operating parameters for the specified elements are regarded as hints or prompts by the hardware and/or software intermediaries and may not be followed or may followed in part. That is, the hardware and/or software intermediaries may make final decisions regarding settings of operating parameters. For example, the PBT controller may make a request to an intermediary hardware entity (e.g., a controller, etc.) that the operating parameters for a given element be set so that the electrical power consumed by the device is reduced by a particular amount, but the intermediary hardware entity may determine that the operating parameters are not to be changed/set as the PBT controller has requested and therefore may leave the operating parameters unchanged. Alternatively, the controller may determine that the operating parameters can be changed/set, but only so that the electrical power for the given element is reduced by less than the particular amount.

In some implementations, the PBT controller makes the above-described adjustments to the operating parameters for specified elements in view of adjustment limiting conditions. Generally, adjustment limiting conditions are conditions under which the above-described adjustments may not be made or may be smaller adjustments than they otherwise might be. The adjustment limiting conditions are or include other electrical power limits, rules, and controls that are in force in the electronic device, such as rules about noise, skin/exterior temperature for the electronic device, etc. In some cases, when the adjustment limiting conditions prevent particular adjustments, the PBT controller, despite finding an excess or deficit in electrical power, will not make the particular adjustments to the operating parameters for the specified elements—or will make smaller adjustments than might otherwise be made. For example, adjustments to operating parameters for a given element to boost the performance of that element might not be made when a temperature of that element exceeds a threshold, etc.

In some implementations, the PBT controller dynamically adjusts the operating parameters for specified elements as described above. The PBT controller can therefore adjust the operating parameters periodically, as specified events occur (or do not occur), based on states of elements, etc. In some of these implementations, a rate at which the PBT controller adjusts the operating parameters for specified elements as described above is limited. In these implementations, therefore, there is an adjustment rate threshold that is used by the PBT controller for determining when operating parameters for the specified elements are to be made. In some of these implementations, the adjustment rate threshold itself can be set and reset based on various conditions.

By determining and using the platform electrical power limit for adjusting operating parameters for specified elements, the described implementations can temporarily reallocate electrical power that is allocated to elements in a group of elements in an electronic device. This can lead to more efficient use of electrical power in the electronic device. By using the adjustment limiting conditions to control the reallocation of electrical power, the described implementations can ensure that the adjustments to the operating parameters for the specified elements are in line with and adhere to existing limitations in the electronic device, which can protect elements in the electronic device from harm or incorrect operation. By using the adjustment rate threshold, the described implementations can avoid the overhead associated with rapidly changing adjustments to operating parameters for the specified elements. The described implementations therefore improve the electronic device's electrical power consumption and performance, which increases user satisfaction with the electronic device.

FIG. 1 presents a block diagram illustrating an electronic device 100 in accordance with some implementations. As can be seen in FIG. 1, electronic device 100 includes processor 102, memory 104, peripheral 106, controller 108, read only memory 110, power supply 112, regulator (REG) 114, and communication fabric 116. Generally, processor 102, memory 104, peripheral 106, controller 108, read only memory 110, power supply 112, regulator 114, and communication fabric 116 are implemented in hardware, i.e., using corresponding integrated circuitry, discrete circuitry, and/or devices. For example, in some implementations, processor 102, memory 104, peripheral 106, controller 108, read only memory 110, power supply 112, regulator 114, and communication fabric 116 are implemented in integrated circuitry on one or more semiconductor chips, are implemented in a combination of integrated circuitry on one or more semiconductor chips in combination with discrete circuitry and/or devices, or are implemented in discrete circuitry and/or devices. In some implementations, processor 102, memory 104, peripheral 106, controller 108, read only memory 110, power supply 112, regulator 114, and communication fabric 116 perform operations for or associated with adjusting operating parameters for specified elements (e.g., functional blocks, devices, etc., such as processor 102, peripheral 106, etc.) to control electrical power consumption by the specified elements based on a relationship (e.g., a difference, an offset, etc.) between a present platform electrical power consumption and a platform electrical power limit as described herein.

Processor 102 is a functional block that performs computational, memory access, control, and/or other operations. For example, processor 102 can be or include a central processing unit (CPU) or CPU core, a graphics processing unit (GPU) or GPU core, a field programmable gate array (FPGA), etc. In some implementations, processor 102 is an accelerated processing unit (APU) that includes one or more CPU cores and one or more GPU cores (i.e., having an integrated graphics processor). In some implementations, processor 102 is an APU and electronic device 100 includes a discrete GPU (e.g., peripheral 106 can be or include a GPU).

Memory 104 is a functional block that stores data for processor 102 and other elements in electronic device 100. For example, in some implementations, memory 104 is a higher capacity integrated circuit memory (e.g., a "main" memory, etc.) into which copies of data (e.g., 4 kB pages of data) retrieved from a storage device (not shown) are stored for accesses by processor 102. Memory 104 includes memory circuitry such as fourth generation double data rate synchronous dynamic random-access memory (DDR4 SDRAM) and/or other types of memory circuits, as well as control circuits for handling accesses of the data stored in the memory circuits.

Peripheral 106 includes a functional block or device that performs various operations and interacts with other elements in electronic device 100. For example, in some implementations, peripheral 106 includes one or more GPUs, embedded processors, application specific integrated circuits (ASICs), digital signal processors (DSPs), network processors, disk drives or non-volatile semiconductor memories, expansion cards (e.g., video/graphics cards, sound cards, network interface controllers, etc.), mice/keyboards, displays, microphones, media players, and/or other peripherals.

Controller 108 is a functional block that performs operations for controlling operating states of elements in electronic device 100. For example, in some implementations, controller 108 is or includes a power controller, embedded controller, and/or management unit that sets operating states of other elements (e.g., processor 102, peripheral 106, etc.) in electronic device 100. As another example, in some implementations, controller 108 is or includes a fan controller that controls the speed of one or more cooling fans in electronic device 100 (not shown).

Read-only memory (ROM) 110 is a functional block having non-volatile memory circuitry (e.g., flash memory, etc.) that is used for storing data that is to persist despite electronic device 100 having been powered down/turned off In some implementations, read-only memory 110 is used for storing basic input output system (BIOS) and/or unified extensible firmware interface (UEFI) files with low-level program code that is executed during startup of electronic device. In some implementations, the BIOS files include BIOS program code that performs the operations of a BIOS as well as the operations described herein (e.g., initializing functional blocks and/or devices in electronic device 100, reporting information to a platform management framework driver, etc.). In some implementations, the BIOS program code provides the platform electrical power limit to a platform boost and throttle controller (as an alternative to the platform management framework driver providing the platform electrical power limit as described herein).

Power supply 112 includes functional blocks and devices that perform operations for supplying electrical power to electronic device. For example, in some implementations, power supply 112 is or includes an external regulator (sometimes called a "power brick") that converts an alternating current (AC) electrical power supply (e.g., wall socket electrical power) to a direct current (DC) electrical power supply. As another example, in some implementations, power supply 112 is or includes a battery that provides a DC electrical power supply.

Regulator 114 includes functional blocks and devices that perform operations for regulating a voltage at which electrical power is supplied to elements in electronic device 100. In some implementations, regulator 114 receives a DC electrical power supply from power supply 112 at an input voltage and converts the input voltage to an output voltage at which electrical power is provided to elements in electronic device 100. For example, regulator 114 may be or include a buck converter, a boost converter, a low-dropout regulator, etc. In some implementations, regulator 114 includes multiple separate voltage regulators, each voltage regulator regulating a voltage at which electrical power is supplied to a respective set of elements in electronic device 100.

Although electronic device 100 is shown in FIG. 1 with a particular number and arrangement of elements, in some implementations, electronic device 100 includes different numbers and/or arrangements of elements. For example, in some implementations, electronic device 100 includes a different number of processors 102. As another example, although shown only with only one peripheral 106, in some implementations, electronic device 100 includes multiple separate peripherals (i.e., functional blocks and/or devices such as digital signal processors (DSPs), network processors, disk drives or non-volatile semiconductor memories, expansion cards, etc.). As another example, although shown with only one controller 108, in some implementations, electronic device 100 includes multiple separate controllers, such as a fan controller, an electrical power controller, embedded controller, etc. Electronic device 100 is also simplified for illustrative purposes. In some implementations, however, electronic device 100 includes additional and/or different elements. For example, electronic device 100 can include separate human interface subsystems (e.g., displays, speakers, keyboards, etc.), electrical power and/or battery subsystems, input-output (I/O) subsystems, etc. Generally, in the described implementations, electronic device 100 includes sufficient numbers and/or arrangements of elements to perform the operations herein described.

Electronic device 100 can be, or can be included in, any device that performs the operations described herein. For example, electronic device 100 can be, or can be included in, a desktop computer, a laptop computer, a wearable electronic device, a tablet computer, virtual or augmented reality equipment, a smart phone, an artificial intelligence (AI) or machine learning device, a server, a network appliance, a toy, a piece of audio-visual equipment, a home appliance, a vehicle, etc., and/or combinations thereof. In some implementations, electronic device 100 is included on one or more semiconductor chips. For example, in some implementations, electronic device 100 is entirely included in a single "system on a chip" (SOC) semiconductor chip, is included on one or more ASICs, etc.

Figure 2:
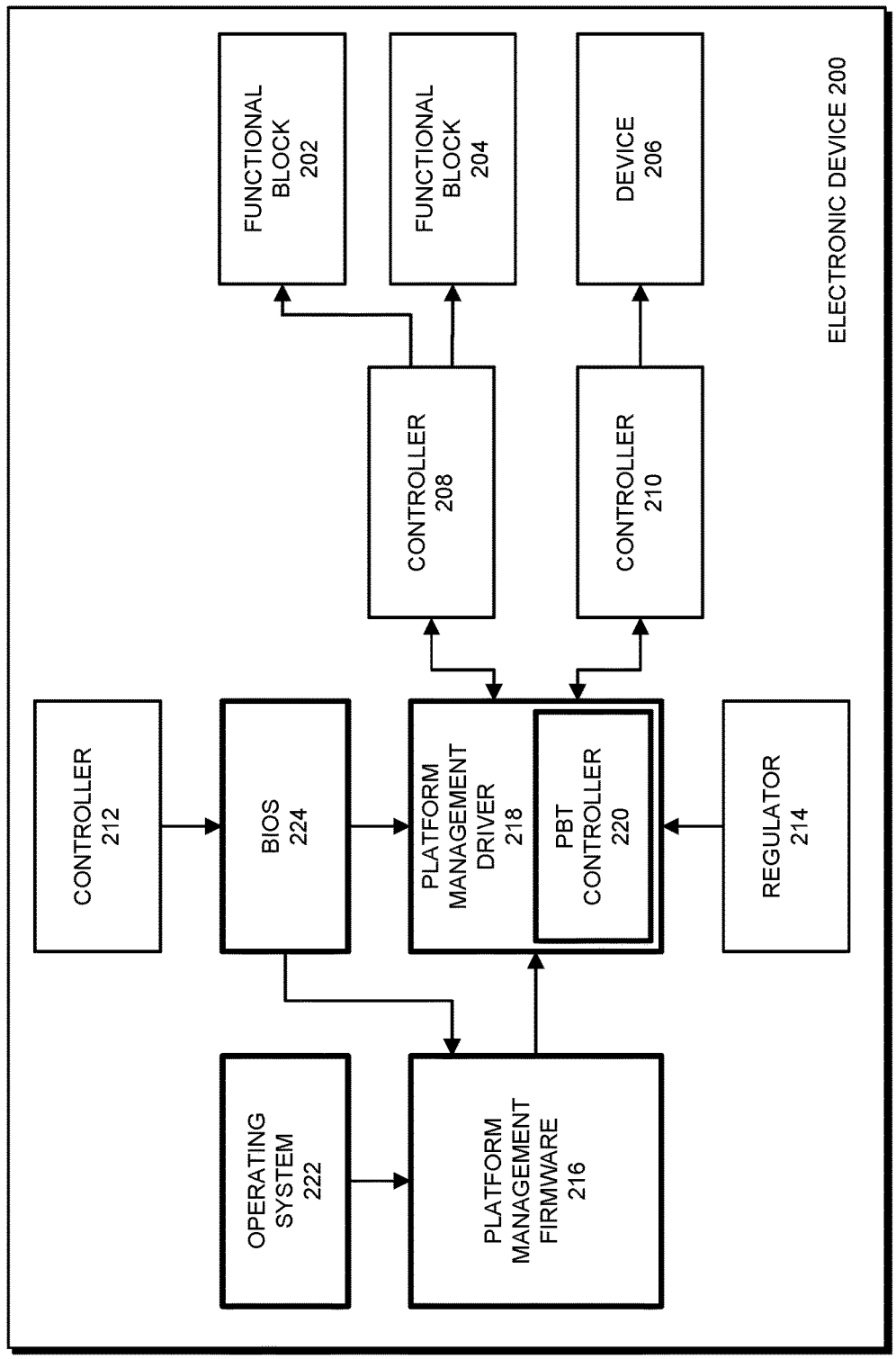
FIG. 2 presents a block diagram illustrating hardware elements and software elements in an electronic device in accordance with some implementations.

In the described implementations, hardware and software elements in an electronic device perform operations for or associated with adjusting operating parameters for specified elements (e.g., processor 102, peripheral 106, etc.) to control electrical power consumption by the specified elements based on a relationship (e.g., a difference, an offset, etc.) between a present platform electrical power consumption and a platform electrical power limit. FIG. 2 presents a block diagram illustrating hardware elements and software elements in an electronic device in accordance with some implementations. In some implementations, some or all of the hardware elements and/or software elements shown in electronic device 200 in FIG. 2 are present in electronic device 100. Generally, the "hardware" elements are functional blocks that include circuitry and/or devices within the electronic device, while "software" elements are software entities executed by the electronic device. In other words, software elements are or include program code that, when executed by one or more processors (or controllers or other functional blocks) in the electronic device, cause the one or more processors to perform the operations described herein (and possibly other operations). For clarity, the software elements in FIG. 2 are shown via bolder/heavier lines than the hardware elements.

The hardware elements shown in FIG. 2 include functional blocks 202-204, device 206, controllers 208-212, and regulator 214. Functional blocks 202-204 each include a functional block such as a CPU or CPU core, GPU or GPU core, ASIC, network interface card, interconnect controller, memory controller, etc. For example, in some implementations, functional block 202 is a CPU or CPU core and functional block 204 is a GPU or GPU core. Device 206 is a device such as a disk drive, a peripheral device (e.g., video card, sound card, expansion card, sensor, etc.), a universal serial bus (USB) device, etc.

Controllers 208-212 are functional blocks or devices that control the operation of, interact with, and/or otherwise handle respective functional blocks and/or devices (i.e., elements). For example, in some implementations, some or all of controllers 208-212 function as intermediaries between associated functional blocks and/or devices and other hardware and/or software entities in electronic device 200. Controller 208 is a controller (e.g., a management unit, embedded controller, power controller, etc.) that controls the operation of, interacts with, or otherwise handles functional blocks 202-204. Controller 210 is a controller that controls the operation of, interacts with, or otherwise handles device 206. For example, in some implementations, controller 210 is a USB controller and device 206 is a USB device. Controller 212 is a controller that controls the operation of, interacts with, or otherwise handles hardware and/or software elements in electronic device 200 for power management or other reasons. For example, in some implementations, controller 212 is an embedded controller. In some implementations, some or all of controllers 208-212 communicate commands, information, and/or other requests to the respective hardware elements (i.e., functional block 202, device 206, etc.) in order to set one or more operating parameters such a clock frequencies, power supply voltages, queue depths, communication rates, memory access rates, and/or other operating parameters for the respective functional blocks and/or devices. By setting the operating parameters, controllers 208-212 can control an operating state or mode of the respective hardware elements. For instance, controller 208 can cause functional block 204 to operate in a lower power operating state such as a sleep or low performance operating state by reducing power supply voltages and/or clock frequencies provided to functional block 204—or by commanding functional block 204 to enter the lower power operating state (i.e., reduce its own power supply voltages and/or clock frequencies).

The software elements shown in FIG. 2 include power management firmware 216, platform management framework driver 218, operating system 222, and basic input output system (BIOS) 224. Power management firmware 216 is a software entity that performs operations of firmware program code executed by a processor (e.g., an embedded controller or microcontroller including controller circuitry, etc.) in the electronic device. Generally, power management firmware 216 performs operations associated with controlling or managing the operation of electronic device 200 as a whole, such as managing the electrical power consumption of elements in electronic device 200 (e.g., functional blocks, devices, etc.), controlling temperatures of elements, etc. For example, power management firmware 216 may receive data, control signals, sensor outputs, event notifications, interrupts, faults, etc. from hardware and/or software entities in electronic device 200 (e.g., controllers 208-210, operating system 222, etc.) and communicate corresponding information to platform management framework driver 218 to be used by platform management framework driver 218 to be used for operations therein. In some implementations, power management firmware 216 interacts with controllers 208-212 for controlling the operating states of functional blocks 202-204 and/or device 206. For this operation, based on information about operating states for some or all of functional blocks 202-204 and device 206 received from platform boost and throttle controller 220 (or otherwise acquired), power management firmware 216 communicates commands, settings, thresholds, and/or other information to some or all of controllers 208-212 to be used by controllers 208-212 for controlling some or all of functional blocks 202-204 and device 206 (as well as other elements, such as fans in electronic device 200 (not shown), etc.). In some implementations, power management firmware 216 also performs other operations associated with platform management. The operations performed by power management firmware 216 are described in more detail below.

Platform management framework driver 218 is a software entity that performs operations of driver program code executed by a processor in the electronic device. Platform management framework driver 218 and power management firmware 216 together are part of a platform management framework that performs operations associated with controlling operating states for elements such as functional blocks 202-204 and device 206. Platform management framework driver 218 receives data, control signals, etc. from power management firmware 216 and other hardware and/or software entities in electronic device 200 that, when considered together, indicate the functioning of electronic device 200 as a whole. This vision into the functioning of the elements in electronic device 200 as a whole enables platform management framework driver 218 to handle controlling electrical power consumption, heat generation, workloads, and/or other aspects of the operation of the various elements in electronic device 200 with regard to their effects on each other. In some implementations, among the operations performed by platform management framework driver 218 is computing a platform electrical power limit that is then forwarded to platform boost and throttle controller 220 for use in setting operating parameters for elements in electronic device 200 as described herein.

Power management firmware 216 includes (or is associated with) platform boost and throttle (PBT) controller 220, which is a software entity (e.g., a routine within or associated with power management firmware 216, etc.) executed by a processor (e.g., an embedded processor or microcontroller including controller circuitry) in the electronic device. PBT controller 220 performs operations associated with setting operating parameters for specified elements in electronic device 200 based on a platform electrical power limit and a present electrical power consumption of elements in electronic device 200. Generally, for this operation, PBT controller 220 compares a present electrical power consumption of elements in electronic device 200 to the platform electrical power limit to determine whether there is surplus of electrical power available in electronic device 200 or a deficit of electrical power in electronic device 200. When there is a surplus of electrical power, PBT controller 220 can temporarily reallocate some or all of the surplus electrical power to the specified elements to help boost the performance of the specified elements. For example, if a peripheral device (e.g., device 206) is idle and is therefore not using the peripheral device's provisioned electrical power, the PBT controller can provide at least some of the electrical power allocated to the peripheral device to a CPU core or GPU core (e.g., functional blocks 202-204) to boost the performance of the CPU core or GPU core. Alternatively, if PBT controller 220 determines that there is a power deficit, PBT controller 220 can reallocate electrical power from the specified elements to other elements. For example, if a universal serial bus (USB) device is connected and/or commences drawing additional electrical power (e.g., to charge a battery in the USB device, etc.), PBT controller 220 can reallocate electrical power from a CPU core or GPU core to make the power available to the USB device. That is, PBT controller 220 can reduce the amount of electrical power provisioned to the CPU core or GPU core so that the USB device can be provided more electrical power without violating the platform electrical power limit.

In some implementations, PBT controller 220 acquires, from regulator 214 (i.e., from electrical power supply circuitry in electronic device 200), information about electrical currents being supplied to elements electronic device 200. PBT controller 220 then computes the present electrical power consumption by the elements in electronic device 200 based on the electrical currents. For example, PBT controller 220 can compute the present electrical power consumption by the elements as a product of currents and voltages at which electrical power is being supplied to the elements, using a lookup table, etc. PBT controller 220 then uses the present electrical power consumption as described above.

Operating system 222 is a software entity that performs operations of an operating system executed by the processor in the electronic device. Operating system 222 interfaces between electronic application software executing on electronic device 200 and lower level software elements (e.g., platform management framework driver 218) and hardware elements (e.g., functional block 202, etc.). For example, operating system 222 may be Windows® from Microsoft of Redmond, Wash., macOS® from Apple, Inc. of Cupertino, Calif., etc. In some implementations, operating system 222 includes software sensors and therefore provides data and information for the software sensors to platform management framework driver 218 (or to power management firmware 216). In other words, one or more sensing routines included within operating system 222 provide sensor values to platform management framework driver 218, the sensor values useable by platform management framework driver 218 for various operations as described herein. For example, in some implementations, operating system 222 senses when elements are plugged into or unplugged from electronic device 200 and reports a corresponding plug event to platform management framework driver 218 to be used as described herein.

BIOS 224 is a software entity that performs operations of a BIOS (and/or a Unified Extensible Firmware Interface (UEFI)) executed by electronic device 200. Generally, BIOS 224 includes program code stored in a read only memory (ROM) (e.g., read only memory 110) that is executed by electronic device 200 (i.e., by a processor in electronic device 200) at startup for initializing elements in electronic device 200, as well as for launching operating system 222. In some implementations, power management firmware 216 and/or platform management framework driver 218 interact with BIOS 224 when performing operations for or associated with adjusting operating parameters for specified elements as described herein. For example, in some implementations, and as an alternative to platform management framework driver 218 determining the platform electrical power limit, BIOS 224 computes the platform electrical power limit. As another example, in some implementations, BIOS 224 reports specified events to platform management framework driver 218 and/or power management firmware 216—at startup or afterwards—that are used for performing operations for or associated with adjusting operating parameters for specified elements as described herein.

Although a number of hardware elements and software elements are presented in FIG. 2, in some implementations, different hardware elements and software elements are present. For example, in some implementations, multiple functional blocks, devices, and/or fans are present in the hardware elements. As another example, in some implementations, controller 208 is not a single controller, but is or includes multiple separate controllers (e.g., a separate functional block controller, a fan controller, etc.). Generally, the described implementations include sufficient hardware elements and software elements to perform the operations described herein.

In addition, although FIG. 2 is presented as an example, FIG. 2 is simplified for clarity and brevity. In some implementations, electronic device 200 includes more hardware and/or software elements. In addition, in some implementations, there are additional interactions between the elements and/or other interactions between the elements, such as interactions between BIOS 224 and operating system 222 during a startup of electronic device 200, etc. Generally, in the described implementations, an electronic device includes sufficient hardware and software elements to enable the operations herein described.

Figure 3:
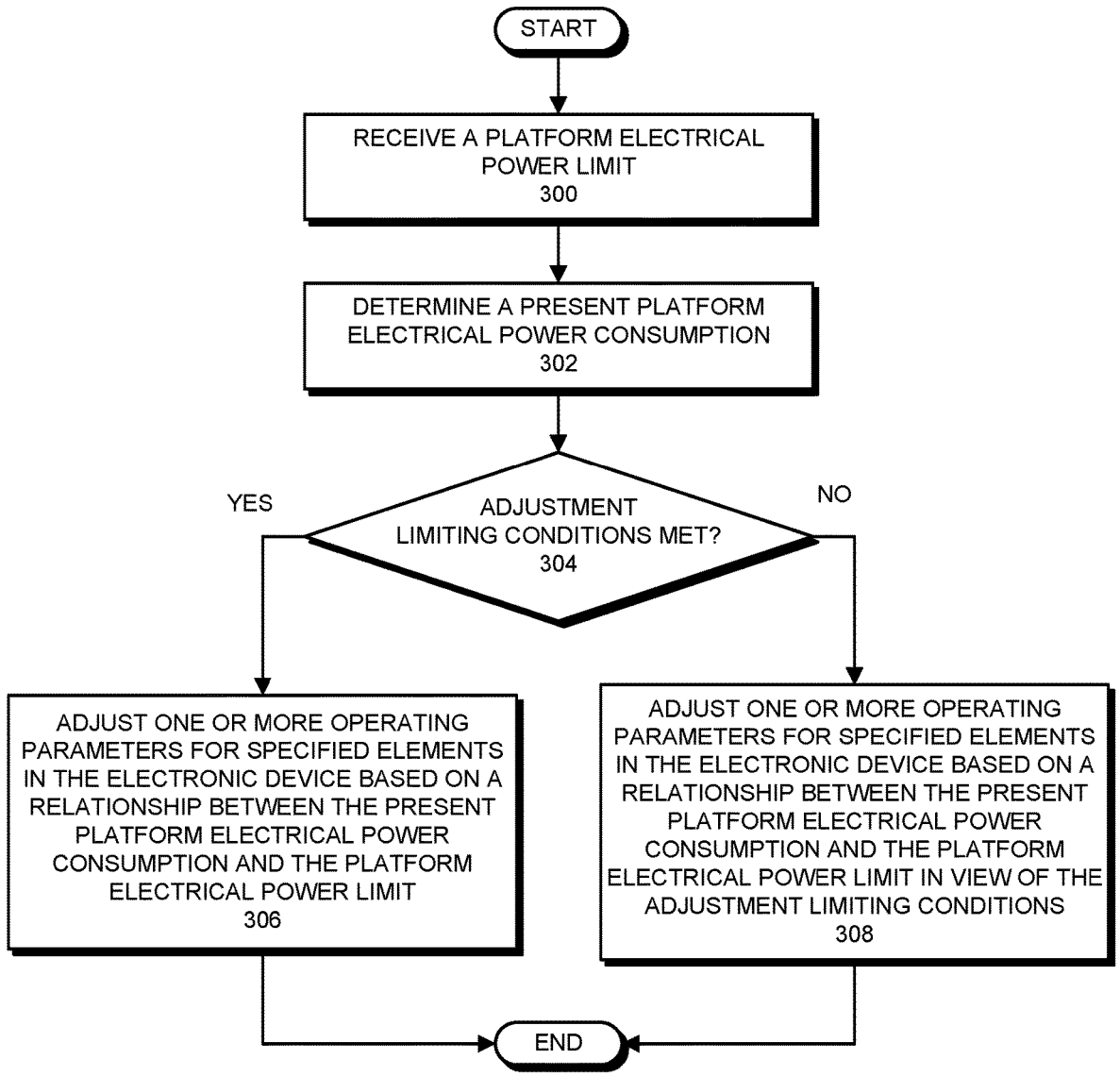
FIG. 3 presents a flowchart illustrating a process for adjusting operating parameters for elements in an electronic device based on a platform electrical power limit in accordance with some implementations.

In the described implementations, a PBT controller (e.g., PBT controller 220) performs operations for or associated with adjusting operating parameters for specified elements (e.g., functional blocks, devices, etc., such as processor 102, peripheral 106, etc.) to control electrical power consumption by the specified elements based on a relationship (e.g., a difference, an offset, etc.) between a present platform electrical power consumption and a platform electrical power limit. FIG. 3 presents a flowchart illustrating a process for adjusting operating parameters for elements in an electronic device based on a platform electrical power limit in accordance with some implementations. FIG. 3 is presented as a general example of operations performed in some implementations. In other implementations, however, different operations are performed and/or operations are performed in a different order. Additionally, although certain elements are described as performing operations for the process, in some implementations, other elements perform the operations.

For the example in FIG. 3 and throughout this description, operating parameters are described as being adjusted for "specified" elements in an electronic device (e.g., functional blocks, devices, etc., such as processor 102, peripheral 106, etc.). The specified elements include elements that are selected by a designer, a software application or operating system, and/or another entity to have their electrical power consumption handled as described herein. For example, a designer or operating system can determine that an APU in the electronic device warrants additional attention as far as the consumption of electrical power due to the APU's importance in overall electronic device performance. In this case, the APU is then be considered a "specified" element. Generally, however, any element or combination thereof can be considered specified elements.

The process shown in FIG. 3 starts when the PBT controller receives a platform electrical power limit (step 300). Generally, the platform electrical power limit is a limit on a total electrical power allowed to be consumed by a group of elements in an electronic device at a given time. In other words, the sum of the electrical power consumed by each element in the group of elements at any time is to remain less than the platform electrical power limit (possibly with one or more exceptions). For this operation, in some implementations, the PBT controller receives the platform electrical power limit from a platform management framework driver (e.g., platform management framework driver 218). For example, the platform management framework driver can compute, generate, or otherwise acquire the platform electrical power limit (e.g., in terms of a number of watts, etc.) and can then provide the platform electrical power limit to the PBT controller (e.g., as described below for FIG. 4). As another example, in some implementations, the PBT controller receives the platform electrical power limit from a BIOS (e.g., BIOS 224). For example, the platform management framework driver and/or the BIOS can compute, generate, or otherwise acquire the platform electrical power limit upon the occurrence of an event, upon a change in the arrangement or number of elements in or connected to the electronic device, upon a change in a power source for the electronic device (e.g., from wall power to battery power, upon a battery reaching a specified charge level or discharge rate, etc.)— and can then provide the platform electrical power limit to the PBT controller.

The PBT controller then determines a present platform electrical power consumption (step 302). For this operation, the PBT controller computes, determines, or otherwise acquires the present platform electrical power consumption. In other words, the PBT controller computes, determines, or otherwise acquires the electrical power consumption at or within a specified time of a present time for a group of elements in electronic device 200 (and electronic device 200 or some portion thereof is the "platform" referred to herein). In some implementations, the group of elements includes all elements supplied by one or more regulators (e.g., regulator 214) or other electrical power supply circuitry. In some implementations, however, the group of elements simply includes all of the elements in the electronic device. For this operation, in some implementations, the PBT controller computes the present platform electrical power consumption based on electrical currents being provided to elements among the group of elements (e.g., as described below for FIG. 5).

The PBT controller then determines whether any adjustment limiting conditions are met (step 304). Generally, in some implementations, the adjustments to the operating parameters for the specified elements as described in FIG. 3 are made (or not) in view of other electrical power limits, rules, and controls that are in force in the electronic device. In these implementations, therefore, adjustments to the operating parameters for the specified elements are not made automatically in view of the platform electrical power limit and the present platform electrical power consumption, but instead take into account the other electrical power limits, rules, etc. When adjustments cannot be made to the operating parameters without violating the other electrical power limits, rules, and controls, therefore, adjustments may not be made—or reduced adjustments may be made. For example, in some implementations, an APU in the electronic device is not permitted to drop below a threshold electrical power consumption (e.g., due to the risk of losing data at corresponding lower clock frequencies and/or power supply voltages). In these implementations, the PBT controller will only reallocate electrical power from the APU when the reallocating will not drop the APU below the threshold electrical power consumption. As another example, in some implementations, temperatures of the elements—or the electronic device itself—are not permitted to exceed a threshold temperature. In these implementations, the PBT controller will only allocate excess electrical power to boost the performance of the elements when the threshold temperature is not likely to be exceeded.

When no adjustment limiting conditions are met, the PBT controller adjusts one or more operating parameters for the specified elements based on a relationship between the present platform electrical power consumption and the platform electrical power limit (step 306). For example, in some implementations, the relationship is a difference, an offset, and/or another mathematical or value comparison between the present platform electrical power consumption and the platform electrical power limit. Generally, for this operation, the PBT controller adjusts the operating parameters for the functional blocks in order to control electrical power consumption by the specified elements—i.e., to reduce or increase the amount of electrical power consumed by the specified elements. For example, the PBT controller can adjust operating parameters such as voltages, currents, bus interface speeds, work queue lengths, etc. for the specified elements to reduce or increase the amount of electrical power consumed by the specified elements. The PBT controller can control the electrical power consumed by the specified elements so that surplus power is reallocated from elements in the group of elements to the specified elements to boost the performance of the specified elements. For example, when a USB device connected to the electronic device has been allocated a particular amount of electrical power (e.g., a relatively large amount of electrical power to account for charging a battery in the USB device), but is not presently using all of the allocated electrical power, some of the particular amount of electrical power can be temporarily reallocated to an APU in the electronic device. In addition, the PBT controller can control the electrical power consumed by the specified elements so that electrical power is reallocated from the specified elements to elements in the group of elements to boost the performance of the elements in the group of elements—and throttle the performance of the specified elements. For example, when a USB device connected to the electronic device is consuming a larger amount of electrical power (e.g., commences charging a battery in the USB device or performing another higher electrical power operation), some of the electrical power allocated to the APU in the electronic device can be temporarily reallocated to the USB device. Examples of operations for reallocating excess electrical power or adjusting for a deficit in electrical power are presented in FIGS. 6 and 7, respectively.

When at least one adjustment limiting condition is met, the PBT controller adjusts one or more operating parameters for the specified elements based on a relationship (e.g., a difference, an offset, etc.) between the present platform electrical power consumption and the platform electrical power limit in view of the adjustment limiting conditions (step 308). Generally, for this operation, the PBT controller determines what adjustments—if any—can be made to the operating parameters for the specified elements based on the adjustment limiting conditions that are met. In these implementations, when the adjustment conditions prevent any adjustment from being made, the PBT controller does not adjust the operating parameters for the specified elements. For example, as described above, when a USB device connected to the electronic device is consuming a larger amount of electrical power, some of the electrical power allocated to the APU in the electronic device might be temporarily reallocated to the USB device. When the APU is already operating at or near a lowest allowable electrical power for the APU, however, the PBT controller can determine that no power can be temporarily reallocated from the APU to the USB device (e.g., because reducing operating parameters such as clock frequency or supply voltage can render too high the likelihood of data loss or other incorrect operation). In this case, the PBT controller may not adjust the operating parameters for the APU (i.e., a specified element) at all. Alternatively, the APU may adjust the operating parameters for the APU, but only enough to reallocate some of the electrical power that would be reallocated to the USB device if the APU was not already operating near the lowest allowable electrical power for the APU.

In some implementations, the above-described operations for adjusting the operating parameters for elements using the platform electrical power limit can be dynamically enabled and disabled. In these implementations, a hardware or software entity (e.g., operating system 222, BIOS 224, a software application executed by the electronic device (not shown), etc.) can communicate a request to the PBT controller to enable or disable the adjustment of the operating parameters. For example, an operating system can receive an input from a user or software application that indicates that the adjustment should be enabled or disabled and can communicate a corresponding request to the PBT controller. When the adjustment is disabled, the operations of FIG. 3 are not performed in the electronic device. In some of these implementations, the adjustment can be automatically enabled or disabled at various times during the operation of the electronic device, such as when operating conditions limit the effectiveness of the adjustments, when particular operating parameters are to be used by the specified elements, etc.

In some implementations, a rate at which the above-described operations for adjusting the operating parameters for elements using the platform electrical power limit can be controlled using an adjustment rate threshold. In these implementations, the rate for adjusting the operating parameters is limited to avoid rapid (and possibly repeating/ping-ponging adjustments) to the operating parameters and the associated overhead. For controlling the rate at which the adjustments are made, the PBT controller monitors how often adjustments are being made over a period of time and prevents adjustments from being made when the rate of adjustments is higher than the adjustment rate threshold (i.e., prevents some or all of the operations of FIG. 3). For example, in some implementations, the PBT controller can forgo or delay adjustments that might otherwise be made, can make adjustments at predetermined times, etc. In some of these implementations, the PBT controller can keep track of adjustments that might have been made but were not due to exceeding the rate adjustment threshold and can use the rate adjustments (e.g., an average thereof, etc.) for subsequent adjustments. In some of these implementations, the adjustment rate threshold can be dynamically set and reset (e.g., based on various conditions, upon the occurrence of a predetermined event, at the request of a hardware or software entity, etc.).

In some implementations, for adjusting the one or more operating parameters, the PBT controller communicates with power management firmware and/or other entities that include mechanisms for making the above-described adjustments. In other words, in order to make adjustments to operating parameters for specified elements, the PBT controller communicates with a hardware and/or software entity that is able to make the actual adjustments for each of the specified elements. In some implementations, the adjustments are not made by the PBT controller directly, but are made via one or more hardware and/or software intermediaries. For example, the one or more hardware and/or software intermediaries can include power management firmware (e.g., power management firmware 216), controllers (e.g., controllers 208-210), a BIOS (e.g., BIOS 224), a platform management framework driver (e.g., platform management framework driver 218), an operating system (e.g., operating system 222), and/or other entities. In some of these implementations, the PBT controller provides hints or suggestions about adjustments to the hardware and/or software intermediaries and the hardware and/or software intermediaries determine whether and to what extent the adjustments are to be made. In other words, in some implementations, the PBT controller does not exercise direct control over the actual adjustments for some or all of the specified elements, but merely provides general guidance to the hardware and/or software intermediaries that control the operating parameters for the specified elements.

Figure 4:
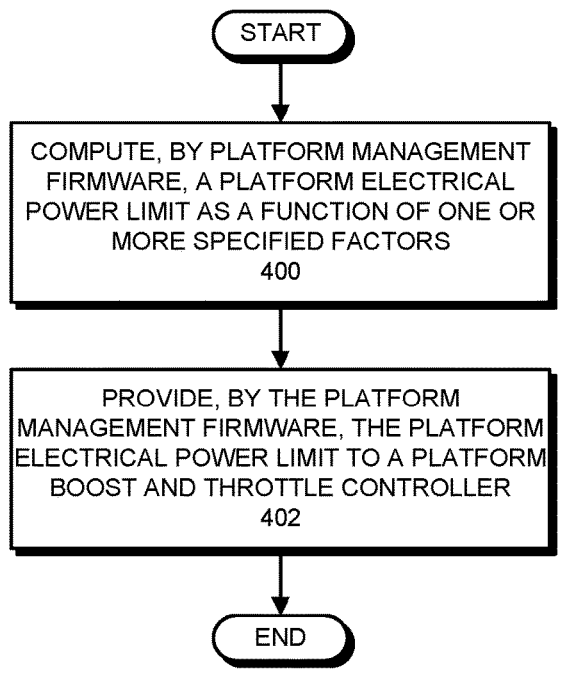
FIG. 4 presents a flowchart illustrating a process for computing a platform electrical power limit in accordance with some implementations.

In the described implementations, platform management framework driver (e.g., platform management framework driver 218) performs operations for computing a platform electrical power limit. FIG. 4 presents a flowchart illustrating a process for computing a platform electrical power limit in accordance with some implementations. FIG. 4 is presented as a general example of operations performed in some implementations. In other implementations, however, different operations are performed and/or operations are performed in a different order. Additionally, although certain elements are described as performing operations for the process, in some implementations, other elements perform the operations.

The process shown in FIG. 4 starts when the platform management framework driver computes the platform electrical power limit as a function of one or more specified factors (step 400). Generally, the platform electrical power limit is a limit on the total electrical power that is permitted to be consumed by a group of elements in an electronic device at any given time (possibly with limited exceptions). For example, the platform electrical power limit can be a limit on the number of watts that are allowed to be consumed by processors, memories, peripheral devices, network interfaces, etc. in the electronic device as a group (i.e., the "group" of elements) at the same time (or substantially the same time). In some implementations, the group of elements includes all of the functional blocks and devices in the electronic device—and thus the platform electrical power limit is a limit on the electrical power that is allowed to be consumed by all of the functional blocks and devices in the electronic device at any given time. For this operation, the platform management framework driver uses the factors, i.e., the values thereof, for determining the platform electrical power limit via a mathematical function, a lookup table, a list, etc. For example, in some implementations, the platform management framework driver uses the values of the factors to perform a lookup in a lookup table that relates each combination of values for the inputs to a platform electrical power limit. For example, assuming that the factors are a source of power for the electronic device and the number of USB devices connected to the electronic device, if the electronic device is receiving electrical power from an AC source (e.g., a wall socket, etc.) and there are two USB devices connected to the electronic device, the platform management framework driver can perform a lookup in the lookup table using corresponding values to find the platform electrical power limit that matches this combination of factors.

In some implementations, the specified factors that are used by the platform management framework driver for computing the platform electrical power limit include factors such as properties of devices presently connected to the electronic device, properties of an electrical power supply for the group of elements, and electrical power consumption limit settings for the electronic device. For example, the properties of the devices presently connected to the electronic device can include properties such as a type of each device presently connected to the electronic device and an electrical power consumption of some or all of the devices presently connected to the electronic device. As another example, the properties of the electrical power supply for the group of elements can include properties such as whether the electrical power supply is from a wall outlet or battery power source, when the electrical power supply is from the wall outlet, an electrical power converter capacity, and, when the electrical power supply is from the battery power source, a discharge rate and/or level of charge in the battery power source. As yet another example, the electrical power consumption limit settings for the electronic device can include properties such as a runtime power limit for the group of elements. Generally, the specified factors can include any factor that is useful in identifying a platform electrical power limit, including factors that might lead to a reduction in the platform electrical power limit (e.g., due to overheating/fan noise, limitations of power supplies, electrical power demands of certain elements, etc.).

The platform management framework driver then provides the platform electrical power limit to a PBT controller (e.g., PBT controller 220) (step 402). For this operation, the platform management framework driver communicates information identifying the platform electrical power limit to the PBT controller. For example, the platform management framework driver can communicate a sequence of bits that precisely identifies the platform electrical power limit, can communicate an indication of a given platform electrical power limit from among two or more platform electrical power limits in a sequence or range of platform electrical power limits, etc.

In some implementations, the platform management framework driver dynamically computes, generates, or otherwise acquires the platform electrical power limit and then provides the platform electrical power limit to the PBT controller. In other words, the platform management framework driver can compute, generate, etc. the platform electrical power limit at various times as the electronic device operates. For example, the platform management framework driver can compute, generate, etc. the platform electrical power limit upon a change in properties of elements, the properties of an electrical power supply for the electronic device, and/or the electrical power consumption limit settings. For example, in some implementations, the properties of the elements can include properties such as an element being unplugged from the electronic device and/or plugged into the electronic device, an element changing an operating mode, an element demanding more electrical power, an element performing specified operations or executing a given workload, etc. As another example, in some implementations, the properties of the electrical power supply include whether (or not) the electrical power supply is an AC/wall socket power supply or a battery, a power converter capacity, a charge level or drain rate of a battery, etc.

Figure 5:
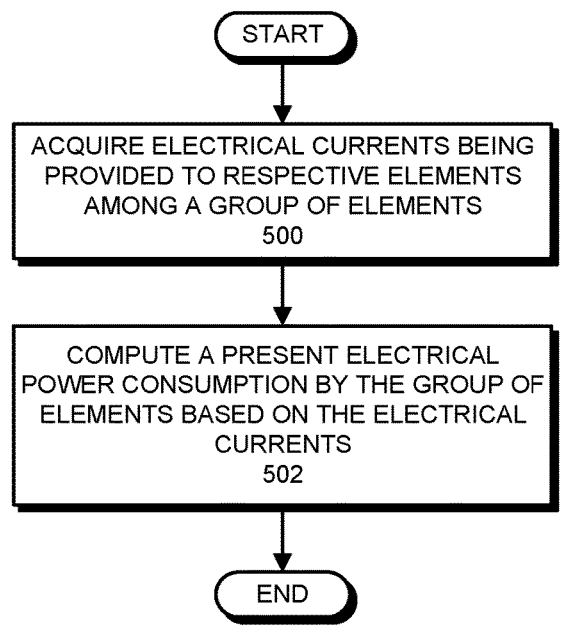
FIG. 5 presents a flowchart illustrating a process for computing a present electrical power consumption in accordance with some implementations.

In the described implementations, a PBT controller (e.g., PBT controller 220) performs operations for computing a present electrical power consumption by a group of elements (e.g., functional blocks, devices, etc.) in an electronic device. FIG. 5 presents a flowchart illustrating a process for computing a present electrical power consumption in accordance with some implementations. FIG. 5 is presented as a general example of operations performed in some implementations. In other implementations, however, different operations are performed and/or operations are performed in a different order. Additionally, although certain elements are described as performing operations for the process, in some implementations, other elements perform the operations.

As can be seen in FIG. 5, the process starts when the PBT controller acquires electrical currents being provided to respective elements among the group of elements (step 500). For this operation, the PBT controller acquires, from electrical power supply circuitry in the electronic device (e.g., voltage regulator 214, etc.) information about electrical currents being supplied to elements in the group of elements. The PBT controller then computes the present electrical power consumption by the group of elements based on the electrical currents (step 502). For example, in some implementations, the PBT controller computes the present electrical power consumption by the elements as a product of currents and voltages at which electrical power is being supplied to the elements. As another example, in some implementations, the PBT controller looks up the present electrical power consumption in a lookup table that relates the electrical currents being supplied to elements to the present electrical power consumption.

Figure 6:
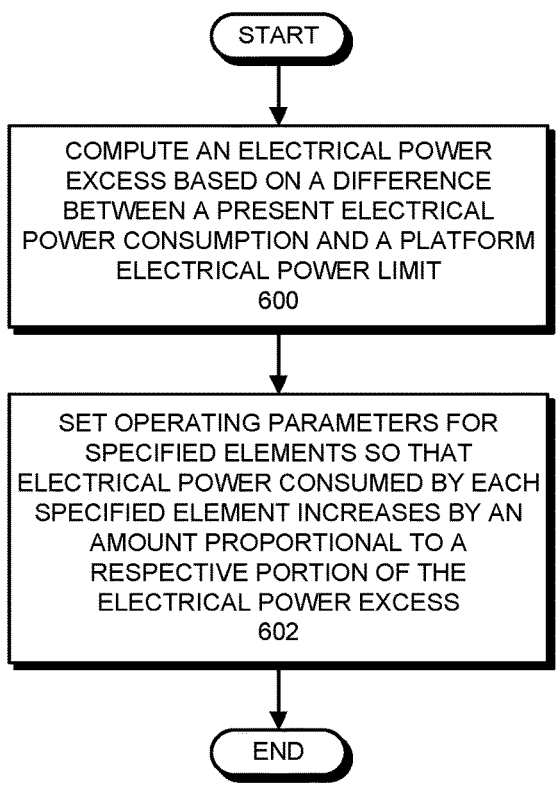
FIG. 6 presents a flowchart illustrating a process for adjusting operating parameters for specified elements in an electronic device where electrical power consumption is to be increased for the specified elements in accordance with some implementations.
Figure 7:
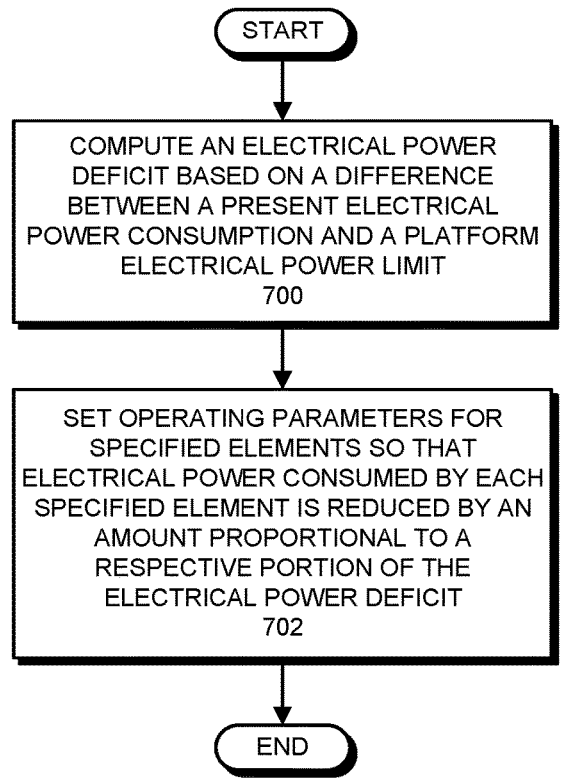
FIG. 7 presents a flowchart illustrating a process for adjusting operating parameters for specified elements in an electronic device where electrical power consumption is to be reduced for the specified elements in accordance with some implementations.

In the described implementations, a PBT controller (e.g., PBT controller 220) performs operations for adjusting operating parameters for specified elements (e.g., functional blocks, devices, etc.) in an electronic device. FIG. 6 presents a flowchart illustrating a process for adjusting operating parameters for specified elements where electrical power consumption is to be increased for the specified elements in accordance with some implementations. FIG. 7 presents a flowchart illustrating a process for adjusting operating parameters for specified elements where electrical power consumption is to be reduced for the specified elements in accordance with some implementations. FIGS. 6-7 are presented as general examples of operations performed in some implementations. In other implementations, however, different operations are performed and/or operations are performed in a different order. Additionally, although certain elements are described as performing operations for the process, in some implementations, other elements perform the operations.

For the operations in FIGS. 6-7, operations similar to those shown in FIGS. 3-5 are assumed to have been performed. The operations shown in FIGS. 6-7 occur in step 306 of FIG. 3—i.e., are examples of the adjustments of operating parameters as described for step 306. Note that operations similar to those described for FIGS. 6-7 can be performed for step 308 in FIG. 3, albeit with considerations made for adjustment limiting conditions (as described above).

The process shown in FIG. 6 starts when the PBT controller computes an electrical power excess based on a difference between a present platform electrical power consumption and a platform electrical power limit (step 600). For this operation, the PBT controller computes a difference between the present platform electrical power consumption and a platform electrical power limit (e.g., subtracts the present platform electrical power consumption from the platform electrical power limit) and determines that there is a positive margin of electrical power available to be reallocated to specified elements in the electronic device. In other words, that some or all of the elements in a group of elements in the electronic device are not presently consuming all of the electrical power allocated to those elements—and thus that there is electrical power available for reallocation.

The PBT controller then sets operating parameters for the specified elements so that electrical power consumed by each of the elements increases by an amount proportional to a respective portion of the electrical power excess (step 602). For this operation, the PBT controller sets the operating parameters to values that result in the specified elements consuming increased electrical power—which results in increased, or "boosted," performance for the specified elements. For example, if there is a K watt excess and the specified elements include only an APU, the PBT controller sets a frequency of a controlling clock and/or a voltage at which electrical power is provided to the APU to increase the electrical power supplied to the APU by K watts (or by up to K watts). Note that this increase is temporary—and can be reversed as described for FIG. 7 if conditions change in the electronic device. That is, the reallocated electrical power can be returned to the elements from which it was reallocated if the elements subsequently have increased electrical power needs.

The process shown in FIG. 7 starts when the PBT controller computes an electrical power deficit based on a difference between a present platform electrical power consumption and a platform electrical power limit (step 700). For this operation, the PBT controller computes a difference between the present platform electrical power consumption and a platform electrical power limit (e.g., subtracts the present platform electrical power consumption from the platform electrical power limit) and determines that there is a negative margin of electrical power available for given elements in a group of elements in the electronic device. In other words, that some or all of the elements in a group of elements in the electronic device are presently consuming all of the electrical power allocated to those elements—and thus that those elements need additional electrical power (and possibly electrical power that was earlier reallocated/borrowed from those elements as described for FIG. 6).

The PBT controller then sets operating parameters for the specified elements so that electrical power consumed by each of the elements is reduced by an amount proportional to a respective portion of the electrical power deficit (step 702). For this operation, the PBT controller sets the operating parameters to values that result in the specified elements consuming reduced electrical power—which results in reduced, or "throttled," performance for the specified elements. For example, if there is a K watt deficit and the specified elements include only an APU, the PBT controller sets a frequency of a controlling clock and/or a voltage at which electrical power is provided to the APU to reduce the electrical power supplied to the APU by K watts (or by up to K watts). The PBT controller can then reallocate the electrical power to elements in the group of elements that need additional electrical power. As described above, this can mean to returning borrowed electrical power allocations to the functional blocks and device in the group of elements that need additional electrical power (such as when the elements commence certain operations or otherwise begin drawing more electrical power). Alternatively, it can mean throttling the specified elements to enable providing a temporary boost to other elements in the group of elements. Note that this decrease can be temporary—and can be reversed as described for FIG. 6 if conditions change in the electronic device.

In some implementations, the PBT controller "sets" the operating parameters as described for FIGS. 6-7 (steps 602 and 702) via one or more hardware and/or software intermediaries—and thus itself does not directly set the operating parameters. For example, the PBT controller may communicate with a controller, a BIOS, etc. to cause the controller, BIOS, etc. to make the actual adjustments to the operating parameters. In some of these implementations, the PBT controller may only provide hints to the one or more hardware and/or software intermediaries that the one or more hardware and/or software intermediaries may choose to (or not to) follow. The PBT controller setting the operating parameters via the intermediary hardware and/or software intermediaries is described in more detail above.

In some implementations, at least one electronic device (e.g., electronic device 100, etc.) or some portion thereof uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., DDR5 DRAM, SRAM, eDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some implementations, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, encryption functional blocks, compute units, embedded processors, accelerated processing units (APUs), controllers, requesters, completers, network communication links, and/or other functional blocks. When circuitry (e.g., integrated circuit elements, discrete circuit elements, etc.) in such hardware modules is activated, the circuitry performs some or all of the operations. In some implementations, the hardware modules include general purpose circuitry such as execution pipelines, compute or processing units, etc. that, upon executing instructions (e.g., program code, firmware, etc.), performs the operations. In some implementations, the hardware modules include purpose-specific or dedicated circuitry that performs the operations "in hardware" and without executing instructions.

In some implementations, a data structure representative of some or all of the functional blocks and circuit elements described herein (e.g., electronic device 100 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, T, and X As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one" of the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some implementations.

The foregoing descriptions of implementations have been presented only for purposes of illustration and description. They are not intended to be exhaustive or to limit the implementations to the forms disclosed. Accordingly, many modifications and variations will be apparent to practitioners skilled in the art. Additionally, the above disclosure is not intended to limit the implementations. The scope of the implementations is defined by the appended claims.

What is claimed is:

1. A method, comprising:
   computing, by a platform management framework driver, a platform electrical power limit as a function of properties of elements presently connected to an electronic device, the platform electrical power limit being a limit on a total electrical power allowed to be consumed by a group of elements in the electronic device at a given time, and the group of elements including the elements presently connected to the electronic device;
   providing, by the platform management framework driver, the platform electrical power limit to a platform boost and throttle (PBT) controller;
   determining, by the PBT controller, a present platform electrical power consumption; and
   adjusting, by the PBT controller, one or more operating parameters for specified elements from among the group of elements to control electrical power consumption by the specified elements based on a relationship between the present platform electrical power consumption and the platform electrical power limit.

2. The method of claim 1, wherein computing, by the platform management framework driver, the platform electrical power limit includes computing the platform electrical power limit as a function of:
   properties of an electrical power supply for the group of elements; and
   electrical power consumption limit settings for the electronic device.

3. The method of claim 2, wherein the computing and providing operations are performed in response to a change in one or more of: the properties of the elements presently connected to the electronic device, the properties of the electrical power supply, and the electrical power consumption limit settings.

4. The method of claim 2, wherein the properties of the electrical power supply include:
   whether the electrical power supply is from a wall outlet or battery power source;
   when the electrical power supply is from the wall outlet, an electrical power converter capacity; and
   when the electrical power supply is from the battery power source, a discharge rate and/or level of charge in the battery power source.

5. The method of claim 1, wherein determining the present platform electrical power consumption includes:
   acquiring electrical currents being provided to respective elements among the group of elements; and
   computing a present electrical power consumption by the group of elements based on the electrical currents.

6. The method of claim 1, wherein adjusting the one or more operating parameters for the specified elements includes:
   setting the operating parameters so that electrical power consumed by the specified elements is increased by:
      computing an electrical power excess based on a difference between the present platform electrical power consumption and the platform electrical power limit; and
      setting the operating parameters for each of the specified elements so that electrical power consumed by that specified element increases by an amount proportional to a respective portion of the electrical power excess.

7. The method of claim 1, wherein adjusting the one or more operating parameters for the specified elements includes:
   setting the operating parameters so that electrical power consumed by the specified elements is decreased by:
      computing an electrical power deficit based on a difference between the present platform electrical power consumption and the platform electrical power limit; and setting the operating parameters for each of the specified elements so that electrical power consumed by that specified element is reduced by an amount proportional to a respective portion of the electrical power deficit.

8. The method of claim 1, further comprising:
adjusting, by the PBT controller, the one or more operating parameters for the specified elements when no adjustment limiting conditions are met; and
when at least one adjustment limiting condition is met:
adjusting, by the PBT controller, the one or more operating parameters for the specified elements based on both:
the relationship between the present platform electrical power consumption and the platform electrical power limit; and
the adjustment limiting condition; or
not adjusting, by the PBT controller, the one or more operating parameters for the specified elements based on the adjustment limiting condition.

9. The method of claim 8, wherein the adjustment limiting conditions include:
electrical power limits for the specified elements; and
limiting conditions from other electrical power management mechanisms in the electronic device.

10. The method of claim 1, wherein:
the determining and adjusting operations are performed at two or more times during an operation of the electronic device; and
a rate at which the determining and adjusting operations are performed is limited by an adjustment rate threshold.

11. The method of claim 1, wherein the group of elements includes at least one of functional blocks and devices in the electronic device.

12. The method of claim 1, wherein:
the elements presently connected to the electronic device include one or more devices; and
the properties of the elements presently connected to the electronic device include a type of the one or more devices.

13. The method of claim 1, wherein the properties of the elements presently connected to the electronic device include an electrical power consumption associated with one or more of the elements.

14. The method of claim 1, wherein the properties of the elements presently connected to the electronic device include an operating mode or a change in the operating mode for one or more of the elements.

15. The method of claim 1, wherein the properties of the elements presently connected to the electronic device include an operation being performed or a workload being executed by one or more of the elements.

16. An electronic device, comprising:
an accelerated processing unit (APU) including processing circuitry configured to perform operations of a platform management framework driver; and
an embedded controller including processing circuitry configured to perform operations of a platform boost and throttle (PBT) controller
wherein the operations of the platform management framework driver include:
computing a platform electrical power limit as a function of properties of one or more of a group of elements presently connected to the electronic device, the platform electrical power limit being a limit on a total electrical power allowed to be consumed by the group of the elements at a given time; and
providing the platform electrical power limit to the PBT controller; and
wherein the operations of the PBT controller include:
receiving the platform electrical power limit;
determining a present platform electrical power consumption; and
adjusting one or more operating parameters for specified elements from among the group of elements to control electrical power consumption by the specified elements based on a relationship between the present platform electrical power consumption and the platform electrical power limit.

17. The electronic device of claim 16, wherein the operations of the platform management framework driver further include computing the platform electrical power limit as a function of one or more of:
properties of an electrical power supply for the group of elements; and
electrical power consumption limit settings for the electronic device.

18. The electronic device of claim 17, wherein the APU is further configured to perform the computing and providing operations in response to a change in one or more of: the properties of the elements, the properties of the electrical power supply, and the electrical power consumption limit settings.

19. The electronic device of claim 18, wherein the properties of the elements include:
a type of each element presently connected to the electronic device; and
an electrical power consumption of one or more of the elements presently connected to the electronic device.

20. The electronic device of claim 17, wherein:
when determining the present platform electrical power consumption, the embedded controller is further configured to:
acquire electrical currents being provided to respective elements among the group of elements; and
compute a present electrical power consumption by the group of elements based on the electrical currents.

21. The electronic device of claim 17, wherein, when adjusting the one or more operating parameters for the specified elements, the embedded controller is further configured to:
set the operating parameters so that electrical power consumed by the specified elements is increased by:
computing an electrical power excess based on a difference between the present platform electrical power consumption and the platform electrical power limit; and
setting the operating parameters for each of the specified elements so that electrical power consumed by that specified element increases by an amount proportional to a respective portion of the electrical power excess.

22. The electronic device of claim 17, wherein, when adjusting the one or more operating parameters for the specified elements, the embedded controller is further configured to:
set the operating parameters so that electrical power consumed by the specified elements is decreased by:

computing an electrical power deficit based on a difference between the present platform electrical power consumption and the platform electrical power limit; and setting the operating parameters for each of the specified elements so that electrical power consumed by that specified element is reduced by an amount proportional to a respective portion of the electrical power deficit.

23. The electronic device of claim 17, wherein the embedded controller is further configured to:

adjust the one or more operating parameters for the specified elements when no adjustment limiting conditions are met; and when at least one adjustment limiting condition is met:
adjust the one or more operating parameters for the specified elements based on both:
a relationship between the present platform electrical power consumption and the platform electrical power limit; and
the adjustment limiting condition; or
not adjust the operating parameters for the specified elements based on the adjustment limiting condition.

* * * * *